United States Patent
Hall, Jr. et al.

[54] ELECTRICALLY RESPONSIVE LIGHT FILTER

[72] Inventors: John A. Hall, Jr., Boston; John J. McCann, Belmont, both of Mass.

[73] Assignee: Polaroid Corporation, Cambridge, Mass.

[22] Filed: Nov. 28, 1969

[21] Appl. No.: 880,796

[52] U.S. Cl. ................... 350/312, 350/160, 350/288
[51] Int. Cl. ........... G02f 1/28, G02f 1/36, G02b 5/24
[58] Field of Search ....... 350/160, 312, 285, 269, 288

[56] References Cited

UNITED STATES PATENTS

| | | | |
|---|---|---|---|
| 3,152,215 | 10/1964 | Barstow et al. | 350/160 |
| 2,185,379 | 1/1940 | Myers et al. | 350/160 |
| 3,169,163 | 2/1965 | Nassenstein | 350/160 |
| 3,303,488 | 2/1967 | Anderson | 350/160 X |
| 3,443,859 | 5/1969 | Rogers | 350/160 |
| 3,476,460 | 11/1969 | Hansen et al. | 350/160 |

[11] 3,692,388
[45] Sept. 19, 1972

*Primary Examiner*—David Schonberg
*Assistant Examiner*—Toby H. Kosmer
*Attorney*—Brown and Mikulka, William D. Roberson and Frederick H. Brustman

[57] ABSTRACT

A controllable light filtering element having an electrolytic cell in which is an electrode having a specularly reflecting surface. The electrode is positioned to reflect light entering the electrolyte through an entrance window toward an exit window. The electrolyte contains a redox agent. Electrode polarity and potential are selected to cause a light absorbing layer to form adjacent the electrode's reflecting surface. Light transmission through the filter is regulated by controlling the current and voltage.

20 Claims, 6 Drawing Figures

PATENTED SEP 19 1972 3,692,388

INVENTORS
JOHN A. HALL, Jr
and
JOHN J. McCANN
BY Brown and Mikulka
and
Frederick H. Brustman
ATTORNEYS

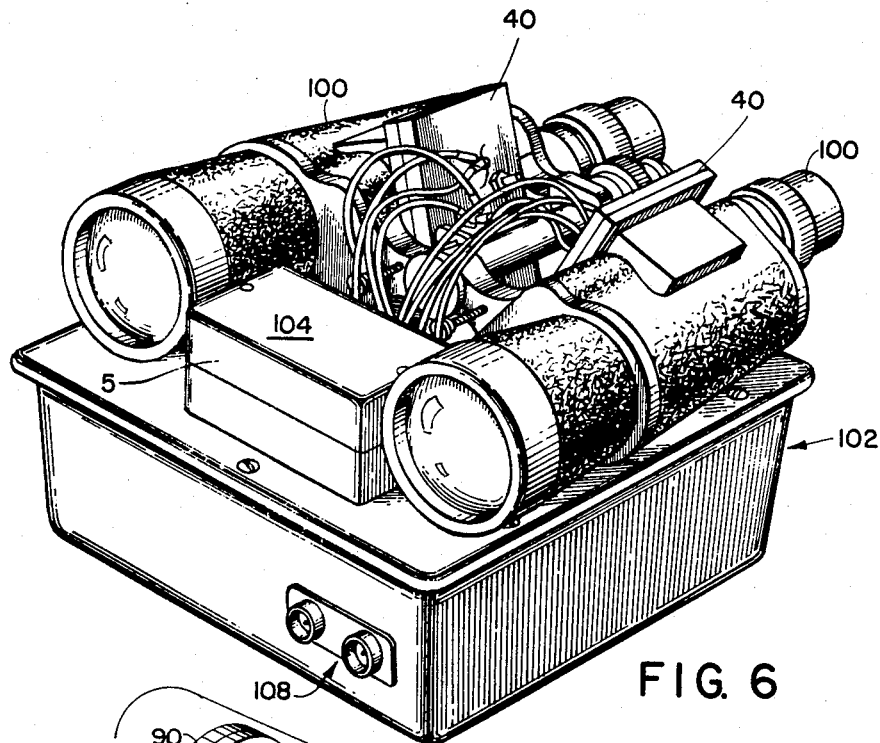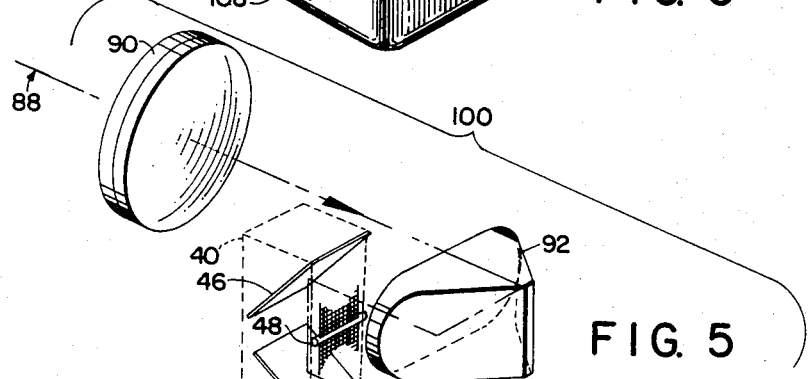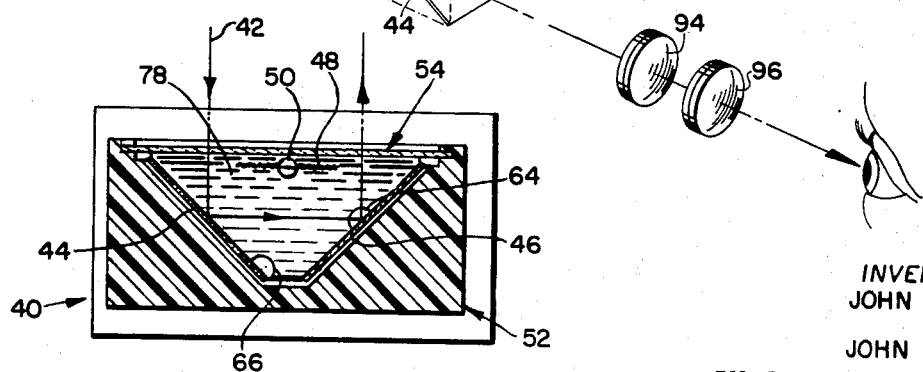

ELECTRICALLY RESPONSIVE LIGHT FILTER

BACKGROUND

Optical filters are useful and convenient means for controlling light. Filters to regulate light intensity or its color are quite common. Often both intensity and color control are incorporated into a single filter element.

Visual comfort and protection are important areas of application for filters. Appropriate selection of spectral filtering properties provides protection for the eyes from the harmful and discomforting effects of ultraviolet and infrared radiation. Eye comfort can be promoted by attenuating filters.

Technical applications of filters are significant and widespread. Filters for alternating the color balance of light for both aesthetic and technical reasons are common in photography. Photometric instruments use filters in several ways: for calibration; alternating an instrument's measuring range; wave length selection; etc. Many other applications for filters exist. They are too numerous to detail.

Typically, a filter has a distinct set of properties which are fixed in its manufacture. In applications which require a variety of filtering properties, it is often inconvenient to change filters individually. Even where a mechanism is provided to change filters, it might be too slow. It might also introduce unwanted mechanical vibrations in sensitive instruments. A second drawback in using filters with fixed properties is that they frequently result in incremental changes of properties whereas continuous change in filter properties may be more desirable.

Filters having continuously variable optical properties are far more versatile than filters having fixed properties. Many filters having continuously variable optical properties heretofore known have drawbacks inherent in their use. For instance, systems utilizing polarization to control intensity are generally inefficient. When set for maximum transmission, they often absorb 50 percent or more of the incident light. Set for maximum absorption, they often permit a certain amount of light in a particular color range to leak through. Polarizing filter systems employing Nichol prisms to minimize these problems have very limited apertures. Polarization filters using electro-optical rotators frequently require the use of dangerous voltages.

Electrolytic deposition has been used to construct filters having continuously variable attenuation. An electrolytic cell having transparent electrodes on its windows is used. Application of an electric potential between the windows causes a metal to deposit on one of the electrodes transmitted through the window. Metallic deposition requires large amounts of power. Operation is often slow. Transparent electrodes used in such cells are noted for their inefficiency both optically and electrically.

SUMMARY

This invention concerns a rapid electrically responsive light absorbing element and filter. In a preferred embodiment, light is incident on an electrode which has a reflective conducting surface immersed in an electrolytic solution. The solution and the polarity of the electrode are selected to cause formation, adjacent to the reflecting surface, of a light absorbing layer when an electric current is passed through the electrolytic solution.

Light passing through a filter possessing this construction is attenuated twice. Once when the light passes through the absorbing layer immediately before incidence on the reflecting surface and a second time when unabsorbed light is reflected back through the attenuating layer. Therefore, the attenuating layer formed adjacent the electrode is doubly efficient. At maximum transmission, this filter is essentially transparent because there is no light absorption within the optical path, for instance, such as that introduced by semitransparent electrodes and the like. Filtering or light absorbing elements of the present invention can readily be constructed for use with light beams having a large cross-section. Rapid response to changes in the filter control can be achieved. Low operating voltages are feasible. An advantage of this electrically responsive light absorbing element and filter is that its spectral range can be altered by changing the electrolytic solution.

The electrically responsive light absorbing element and filter of this invention can be constructed in the form of an electrolytic cell containing a mirror electrode positioned in the optical path to reflect an entering light beam toward an exit window. A second electrode is positioned outside of the optic path. They are immersed in an electrolytic solution containing a redox agent or indicator dye. Means to impose a select voltage between the electrodes is provided. The dye or redox agent and the polarity of the electrode are chosen so an absorbing layer forms in the electrolyte adjacent the reflecting surface of the mirror electrode. In a filter according to this invention, the total effect of the filter is that of the absorbing layer squared.

An object of this invention is to provide a rapid electrically responsive reflective light absorbing element and filter of new and novel construction.

Another object of the invention is to provide a novel electrolytic filter which is continuously variable between substantial transparency and opacity.

Yet another object is to provide a unique electrically responsive light absorbing element using a reflecting electrode which is reversible and whose spectral range can be changed. Still another object of this invention is an electrically controlled light absorbing element which is quickly responsive to control changes.

Other objects of the invention will, in part, be obvious and will, in part, appear hereinafter.

The invention accordingly comprises the apparatus possessing the construction, combination of elements and arrangement of parts which are exemplified in the following detailed disclosure, and the scope of the application which will be indicated in the claims.

For a fuller understanding of the nature and objectives of the invention, reference should be had to the following detailed description taken in connection with the accompanying drawings wherein:

FIG. 4 is a cross-section of the light filtering element shown in FIG. 3;

FIG. 5 is a schematic showing the light filtering element of FIG. 3 incorporated in an optical system;

FIG. 6 shows the light filtering element of FIG. 3 installed in a pair of binoculars.

DETAILED DESCRIPTION

Figure 1:
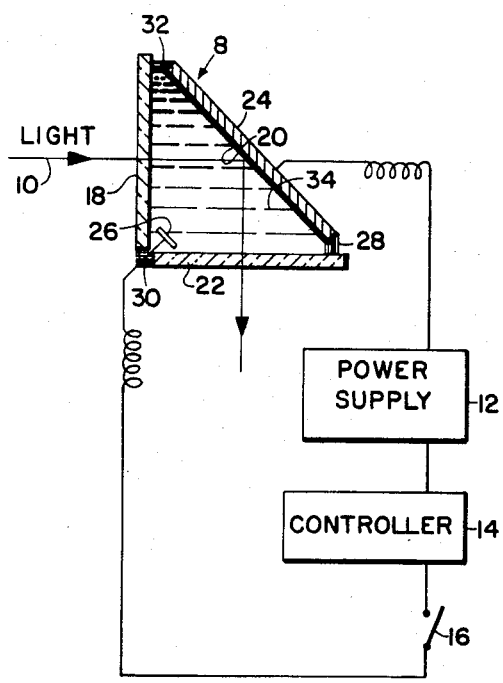
FIG. 1 is a schematic arrangement of an electrically controllable light absorbing element according to this invention.

Reference should be had to FIG. 1. A schematic representation of the electrically responsive light filter is shown. The principle components are a transparent electrolytic cell 8, power supply 12, controller 14 and switch 16.

Power supply 12, controller 14, and switch 16 are part of an electric circuit which includes the anode 26 and cathode 24 of electrolytic cell 8. Controller 14 is the means by which current and voltage in cell 8 are controlled. Electrolytic cell 8 is constructed to transmit light with at least one reflection. Light rays 10 incident on electrolytic cell 8 pass through entrance window 18 and are incident on electrically conductive reflector or mirror 20. Mirror 20 reflects incident light rays 10 through exit window 22. The surface of electrically conductive reflector 20 serves as electrode 24. Electrode 24 can be anodic or cathodic as required by a subsequent choice of electrolytic solution 34 and its related chemistry. In the present embodiment, electrode 24 is cathodic. The second electrode 26 is positioned within cell 8 opposite electrode 24. Electrode 26 is given a polarity opposite electrode 24. Electrode 26 is positioned in cell 8 so it does not obscure the optical path taken by light rays 10. Seals 28, 30 and 32 confine the electrolytic solution 34 within cell 8.

Electrolytic solution 34 forms a conduction path between reflection electrode 24 and electrode 26. The entire reflecting surface of mirror 20 is immersed in electrolyte 34. Electrolyte 34 contains at least one agent whose light absorption properties change in the presence of an electric field and/or current. Ideally, this change should take place in the immediate vicinity of an electrode. Electrolyte 34, its color changing agent, and polarity of electrodes 24 and 26 are chosen so that the color change is concentrated adjacent reflecting surface 20 of electrode 24.

Concentrating the agent having altered light absorbing properties in a thin layer against the mirror 20 reduces the statistical probability that light rays 10 might pass through cell 8 without being affected by a molecule of the color agent. By concentrating the light absorbing agent at mirror 20, its effectiveness is markedly increased. Located at either window 18 or 22, the layer would absorb light rays 10 only once. At the surface of mirror 20, the layer absorbs light rays 10 once before they are incident on mirror 20 and again after reflection. The cell's transmission is the square of the layer's transmission because of the double pass through the absorbing layer.

Substances are known whose optical density or spectral absorption characteristics change in relation to an electric current passing through an electrolyte containing them in solution. The changes usually occur in the vicinity of one electrode. In general behavior of such substances utilizes the well-known phenomenon that when two electrodes in the electrolytic solution are oppositely charged, there is an alteration in the concentration of anions and cations in the vicinity of the poles. A zone of high pH is created at one electrode. A low pH zone is formed at the opposite electrode. Between the electrodes exists a zone where the migrating ions meet and neutralize each other. An acidic environment is created in the vicinity of the anode and a basic environment in the vicinity of the cathode. In like manner oxidizing and reducing zones exist adjacent the electrodes depending upon the surplus or deficiency of electrons thereat. Oxidation reactions occur adjacent the anode. Reduction reactions take place at the cathode.

One class of reversible color responsive materials are pH or acid-base indicators whose spectral absorption characteristics are determined by the pH of their environment. Examples of suitable indicator dyes which change their spectral absorption properties at specific hydrogen activity levels are listed in a table entitled "Acid-Base Indicators," published in *The Handbook of Chemistry and Physics*, Chemical Rubber Company, 1966. Color changes associated with pH values are given.

Another important class of useful materials are redox or oxidation-reduction indicators. Their spectral absorption characteristics change upon being alternately reduced and oxidized. Examples of suitable redox indicator dyes are set forth in the table entitled "Some Oxidation-Reduction Indicators" published in *Chemical Indicators*, O. Tomicek, Butterworths Scientific Publications, 1951. Given in that table is the standard set electrical potential at which a specific dye is half oxidized and half reduced.

Spectral absorption properties of indicator dyes are directly responsive to the pH of the whole solution. In an electrolytic cell pH is controlled by electrical current through the cell. Therefore, in an appropriately designed electrolytic cell spectral absorption properties of indicator dyes and redox agents are directly related to the electrical condition of the cell. When a pH change is localized in the cell, the spectral absorption changes are localized as a result.

Customarily, the electrically responsive redox agent or dye is dissolved in an electrolytic solution. By electrolytic solution is meant one which is ionizable in the presence of a suitable electric current. Such a solution is capable of providing ions to effect the desired change in optical density or spectral absorption characteristics of the dye or redox agent. Illustrative of ionizable materials commonly employed as electrolytes are sodium chloride, copper perchlorate, acid zinc sulfate, lead nitrate and hydrochloric acid. The solvent can be water or an electrically stable organic liquid such as propylene glycol or ethylene glycol monomethyl ether.

Using an ionizable substance in the solution however, is not essential with all electrically responsive materials. Certain redox compounds, such as those which are capable of forming a stable, colored free radical upon the addition of electrons, act as their own electrolyte. They may be used either in the presence or absence of other ionizable substances. That is, they can be used either in an ionic or electronic system. Systems utilizing redox compounds of this type are described and claimed in copending application Ser. No. 854,522 of Howard G. Rogers assigned in common herewith.

In addition to electrically responsive color changing materials, the solvent and the ionizable substances if used the electrolytic solution can contain viscosity-imparting agents such as carboxymethyl cellulose or hydroxethyl cellulose. Alternately, it can contain a gelling agent such as gelatin or hydrolyzed polyisopropenyl acetate. The latter agents provide a solid rather than liquid medium. Other solid systems include those wherein the electrically responsive color changing material and an electrolyte, if desired, are dispersed in a compatible polymeric matrix such as polyvinyl acetate or polystyrene. The specific advantage of these high viscosity or solid systems is that localized color changes will remain localized for long periods of time. In low viscosity liquid systems circulation, convection or Brownian motion can disperse the altered redox agent diminishing the effect of the electrically responsive filter element described herein. An electrolyte with a viscosity greater than 50 centipoises at 20°C is preferable.

In optical density and color filtering devices using materials that reversibly change, it is apparent that alternating the direction of current produces color at the opposite electrode. Ability to clear an electrically responsive filter device is a desirable feature. It is possible to use a selectively permeable light transmitting membrane such as cellophane or other means between the electrodes ionic migration. Color formation then occurs at one electrode only and is substantially prevented at the other electrode. Alternative to restricting ionic movement as a means of permitting alternate changes of the device from an absorbing mode to transmitting mode, the reversible redox agent or dye may be rendered non-migratory. The redox agent or dye is fixed at an appropriate location, e.g., at mirror 20, it does not move while the ions can move freely in the solution. Systems employing a permanently positioned material having reversibly alterably spectral absorption characteristics are described and claimed in U.S. Pat. No. 3,443,859 to Howard G. Rogers issued May 13, 1969.

A desirable redox agent for use in the electrically responsive filter cell of this invention is methyl viologen. Methyl viologen does not require a separate electrolyte in solution with it. It acts as its own electrolyte. Methyl viologen is substantially colorless in solution. Addition of an electron to its shell causes it to become strongly absorbing throughout most of the light spectrum. Adding an electron to methyl viologen so it becomes absorbing requires a potential of approximately 2.5 volts or greater. The solution containing methyl viologen alone in solution is suitable for use in the electrically responsive filter described herein. It is known that adding other electrolytes to the methyl vilogen solution increases the speed at which the color changes can be effected within the filter cell of this invention. It is presently believed that the increased speed is due primarily to higher currents which can be impressed on a cell at a specified voltage when additional electrolytes are present. A preferred electrolyte for use in the cell described herein contains:

methyl viologen: 5.0 grams;
water: 13.4 cc;
hydrochloric acid, concentrated 38 percent by weight: 3.4 cc;
ceric ammonium nitrate 0.2 cc.

Figure 2:
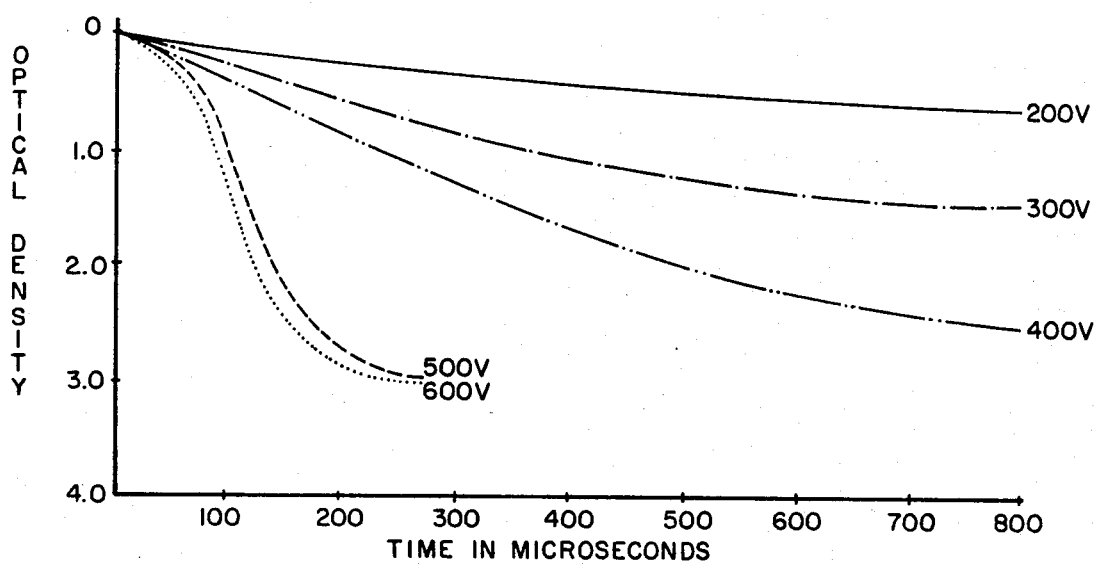
FIG. 2 is a graph of opacity versus elapsed time for a specific redox agent and electrical means.

Refer to FIG. 2. Shown therein are curves representing the optical performance, with respect to time, of the electrically responsive filter cell described herein. Optical performance of the filter is set forth in FIG. 2 in terms of the time required to reach a particular optical density after a given amount of electrical energy is discharged between the electrodes of the cell.

Optical density is a measure of the amount of incident light which the filter transmits. It is expressed in powers of ten. Therefore, a density of one indicates that the cell transmits one-tenth of the incident light. A density of 2 means that transmission equals one-hundredth of the incident light.

The electrical system used to change the spectral absorption properties of methyl viologen in this cell is a capacitor of 350 microfarads charged to the voltages indicated in FIG. 2. Electrical resistance of the filter was measured to be 1.5 ohms. Color change was initiated by the discharging of the capacitor directly across the filter cell.

Five different capacitors voltages are represented in the curves of FIG. 2. It is clear from the curves that as the voltage increases yielding a geometric increase in current, optical density increases markedly. It is also evident that the time to reach a particular optical density becomes shorter as the voltage and corresponding current density at the electrode increase. In this example, the number of electrons available to alter the filter is proportional to the voltage squared. Little difference exists between the optical density to be achieved at 500 volts and 600 volts. It is believed that this is because the system has accepted as many electrons as it can under the existing conditions. Specific optical densities are reached in a shorter time interval at higher voltages. This is probably because the necessary number of electrons to achieve a specific optical density enter the cell in a shorter time at the higher voltage. Experience shows that reduced methyl viologen tends to slowly oxidize over a period of time, thus clearing the solution. Self clearing will tend to effect the time in which a particular level of opacity can be achieved if trickle currents are used to control the optical density.

Self clearing is an advantage in a system which is to be used repetitively and reversibly. It has been discovered that the clearing time of a dark methyl viologen solution can be accelerated in several ways. Oxygen or other oxidizing materials can be introduced into the solution. A reversal of electrical current between the electrodes is another means for clearing the cell. The accelerating potential between the electrodes could be slightly less than the voltage required to change the spectral properties of the redox agent. In addition, convection, Brownian motion and even forced circulation can be employed to reduce the concentration of the redox agent at the mirror electrode.

Figure 3:
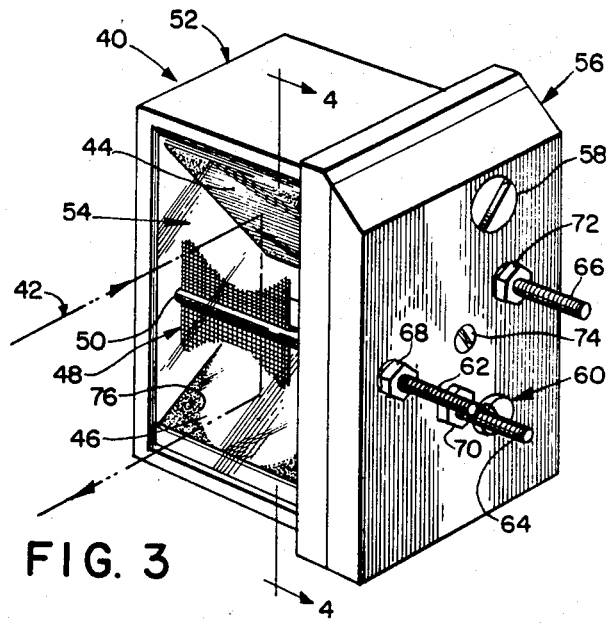
FIG. 3 shows a light filtering absorbing element according to this invention in the form of a porro prism.

An example of how the electrically responsive electrolytic filter cell of this invention can be incorporated into an optical instrument is shown in FIGS. 3 through 6. In FIG. 3 is shown a porro prism 40 whose reflecting surfaces 44 and 46 are mirror electrodes according to this invention. Light rays 42 incident on mirror electrode 44 are reflected downward toward mirror electrode 46 and thence toward the direction from which they came. A fine wire mesh anode is positioned opposite electrodes 44 and 46. To maximize its area without interferring with the transmission of lights rays 42 it is given an hourglass shape. The shape of anode 48 presumes that light beams 42 have circular cross-section. Anode 48 is mounted on an electrically conductive supporting post 50. The electrodes 44, 46 and 48 are set within a container 52 made from a dielectric material. A window 54 in the wall of container 52 allows light beam 42 to enter container 52 and exit therefrom after reflection by electrodes 44 and 46. A cover 56 is provided for container 52. Reflecting electrodes 44 and 46 and anode 48 are structurally fixed to cover 56. Cover 56 is fastened to container 52 by screws 58 and 60. Binding post 62 passes through cover 56 to provide electrical connection to post 50 and anode 48. In like manner, binding posts 64 and 66 pass through cover 56 to provide electrical connection to mirror electrodes 46 and 44, respectively. Nuts 68, 70 and 72 facilitate the connection of electrical leads to binding posts 62, 64 and 66. Screw 74 closes a port through which the electrolyte can be poured into the electrolytic cell. In this example, the electrolyte comprised a solution of methyl viologen in water and certain accelerating agents. Having selected methyl viologen as the electrolyte reflecting electrodes 44 and 46 are made cathodic. Electrons enter the electrolyte at the cathodic surface of the mirrors 44 and 46 forming opaque layers thereat. Light 42 entering porro prism 40 suffers four successive absorptions before leaving. There is an absorption prior to incidence and another after reflection from each mirror surface, four in all. Reflecting electrodes 44 and 46 are in separate electrical circuits having a common anode 48. Porro prism 40 thus consists of two electrically responsive electrolytic light filtering elements in succession.

A cross-section of porro prism 40 is shown in FIG. 4. It can be seen that an electrolytic reaction takes place between anode 48 and cathodic reflecting electrode 46 which comprised the electrodes for one electrical circuit. A second reaction occurs at the cathodic reflecting surface of electrode 44 which is part of an electrical circuit established between anode 48 and cathode 44. Separate electrical circuits are used for each reflecting electrode to insure that the darkening reaction is distributed between them.

Referring back to FIG. 3, one can see that reflecting electrode 46 has a dielectric coating 76 on its reflecting surface. Dielectric coating 76 inhibits the transfer of electrons from electrode 46 into the electrolytic solution 78 in those areas where light beam 42 is not incident on electrode 46. This concentrates the electrolytic reactions only in the areas where light is incident on mirror electrode 46. Mirror electrode 44 is coated in a similar manner.

In FIG. 5, electrolytic porro prism 40 is shown in relation to the other components of a binocular telescope. In this arrangement, porro prism 40, comprising dual electrically responsive electrolytic filtering elements, permits controlling light transmitted by the binocular at a comfortable level for viewing. Optical density of porro prism 40 can be controlled manually by the observer himself and adjusted to the level he finds comfortable. The fast response of the electrolytic cell to moderate voltages, as shown in FIG. 2, means that it can rapidly change its absorption to control variations in optical brightness. Extreme changes in brightness might otherwise be very discomforting to an observer's vision.

Light 88 is focused by object lens 90. It is incident on porro prism 92 which is part of an erecting system composing porro prisms 92 and 40. Light 88 is reflected by prism 92 forward onto mirror electrode 46 of prism 40 and then to mirror electrode 44 from which it proceeds to the eye piece comprised of lenses 94 and 96. Absorbing layers are formed on mirror electrodes 44 and 46 as described above. By means of these absorbing layers, the total light transmission through the optical system can be controlled.

FIG. 6 shows the binocular optical system schematically presented in FIG. 5 in the complete system. Electrically responsive electrolytic filtering porro prisms 40 are installed in each optical path 100 of a pair of binoculars. The binoculars are mounted on a housing 102 which contains a capacitor and other electrical circuitry. A battery in case 104 supplies the electrical energy necessary to operate this system. Light detector 108 senses changes in ambient light intensity coming from the direction in which the binoculars are pointed. Electronic circuitry within housing 102 increases the optical density of porro prisms 40 in relation to the increased amount of light sensed by detector 108.

Since certain changes may be made in the above apparatus without departing from the scope of the invention herein involved, it is intended that all matter contained in the above description or shown in the accompanying drawings shall be interpreted as illustrative and not in a limiting sense.

We claim:

1. Apparatus for selectively filtering light passing along an optical path comprising:
    a first electrode;
    mirror means situated within said optical path for specularly reflecting said light and for functioning as a second electrode; and
    means for forming, in said optical path, an optical filtering layer, from electrolyte means, adjacent said mirror means by the presence of a select electric potential between said electrodes having a predetermined polarity.

2. The apparatus as described in claim 1 further comprising:
    means for imposing said select electric potential having a predetermined polarity on said filter layer forming means.

3. The apparatus as described in claim 2 wherein said filter layer forming means includes a redox indicator dye.

4. The apparatus of claim 3 wherein said mirror means further comprises electrode means for making electrical contact with said electrolyte means.

5. Apparatus for selectively filtering light passing along an optical path comprising:
    reflector means situated in said optical path for specularly reflecting said light;
    electrolyte means, contacting said reflector means, for forming a light absorbing layer in said optical path adjacent said reflector means, said electrolyte means characterized in forming said light absorbing layer in the presence of an electric potential of select value having a predetermined polarity, the optical density of said absorbing layer being functionally related to said electric potential value; and
    electrode means, including the specularly reflecting surface of said reflector means, for making electrical contact with said electrolyte and between which said electric potential can be established.

6. The apparatus as described in claim 5 further comprising means for imposing said select electric potential on said electrode means and thereby through said electrolyte to cause formation of said absorbing layer at said reflector means.

7. The apparatus as described in claim 6 wherein said means for imposing said select potential further comprises means for controlling said select electric potential.

8. The apparatus as described in claim 5 wherein said electrolyte contains a redox indicator dye.

9. The apparatus as described in claim 8 wherein said redox indicator dye is methyl viologen.

10. An apparatus for selectively filtering light passing along an optical path comprising:
   at least one electrode having a specularly reflecting conducting surface situated within said optical path to reflect said light;
   another electrode spaced apart from said reflecting electrode;
   means for imposing select electric potential having predetermined polarity between said reflecting electrode and said other electrode; and
   a transparent electrolytic solution, in said optical path, in which said reflecting electrode and said other electrode are immersed forming an electrically conductive path therebetween, said electrolytic solution being characterized in forming a light absorbing layer in said optical path adjacent to said specularly reflecting conducting surface in the presence of a select electric potential value having said light absorbing layer being functionally related to said electric potential value.

11. The apparatus of claim 10 wherein said other electrode is spaced apart from said reflecting electrode and positioned substantially outside of said optical path.

12. The apparatus as described in claim 10 including means for controlling said select electric potential.

13. The apparatus of claim 10 wherein said electrolytic solution contains a redox indicator dye which changes its optical properties on being alternately reduced and oxidized.

14. The apparatus described in claim 13 wherein said redox agent is methyl viologen.

15. The apparatus described in claim 10 wherein said electrolytic solution is gelatinous.

16. An electrically responsive controllable light filter as in claim 10 wherein said electrolyte has viscosity greater than 50 centipoises at 20° C.

17. Apparatus for selectively filtering light passing along an optical path comprising:
   a container enclosing a portion of said optical path;
   a solution, situated so as to fill said optical path within said container, capable of changing its light absorption properties in response to an electric current;
   an entrance window in said container for admitting said light into said electrolyte;
   an exit window in said container through which said light can leave;
   at least one electrode having a specularly reflecting conducting surface immersed in said electrolyte and situated to reflect said light entering through said entrance window along said optic path toward said exit window;
   another electrode immersed in said electrolyte spaced apart from said reflecting electrode and positioned substantially outside of said optical path;
   means for imposing select electrical potential, having predetermined polarity, between said reflecting electrode and said other electrode across said optical path; and
   said electrodes contacting said solution.

18. The apparatus described in claim 17 wherein said solution contains an electrolyte and a redox indicator dye.

19. The apparatus described in claim 17 wherein said solution contains methyl viologen.

20. An image forming optical system having an optic axis and including an electrically responsive light filtering element to control the amount of light transmitted through said system comprising:
   at least one electrode having a specularly reflecting conducting surface positioned to reflect light passing along said optic axis;
   another electrode spaced apart from said reflecting electrode;
   means for imposing select electric potentials having predetermined polarity between said reflecting electrode and said other electrode; and
   a transparent electrolytic solution contacting said electrodes and forming an electrically conductive path therebetween, said electrolytic solution being characterized in forming a light absorbing layer in an optical path defined by said optic axis and adjacent said specularly reflecting conducting surface in the presence of a select electric potential having said predetermined polarity, the optical density of said light absorbing layer being functionally related to the value of said electric potential.

* * * * *